(12) United States Patent
Epstein et al.

(10) Patent No.: US 10,154,042 B2
(45) Date of Patent: Dec. 11, 2018

(54) ACCOUNT SHARING DETECTION

(71) Applicant: Cisco Technology, Inc., San Jose, CA (US)

(72) Inventors: Steven Jason Epstein, Hashmonaim (IL); Hillel Michael Solow, Bet Shemesh (IL); Ariel Imber, Tekoa (IL); Roee Friedman, Modi'in (IL); Harel Menachem Cain, Jerusalem (IL); Melvyn Adam Mildiner, Beit Shemesh (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 186 days.

(21) Appl. No.: 15/142,459

(22) Filed: Apr. 29, 2016

(65) Prior Publication Data

US 2017/0195337 A1     Jul. 6, 2017

Related U.S. Application Data (60) Provisional application No. 62/274,671, filed on Jan. 4, 2016.

(51) Int. Cl.
*H04L 29/06*     (2006.01)
*G06F 21/10*     (2013.01)
(Continued)

(52) U.S. Cl.
CPC .......... *H04L 63/102* (2013.01); *G06F 21/10* (2013.01); *G06Q 10/063* (2013.01);
(Continued)

(58) Field of Classification Search
CPC .......... G06F 21/00; G06F 21/10; G06F 21/31; G06F 21/50; H04L 63/102; H04L 63/08; H04L 63/1433; H04L 63/20
See application file for complete search history.

(56) References Cited

U.S. PATENT DOCUMENTS 8,285,658 B1 * 10/2012 Kellas-Dicks ........ G06F 21/316
706/20
9,420,002 B1 * 8/2016 McGovern ............. H04L 63/10
(Continued)

OTHER PUBLICATIONS

Samartzi, Account-sharing: a legitimate alternative to unlawful circumvention for the purposes of achieving content portability, 27 pages (Year: 2012).*
(Continued)

*Primary Examiner* — Benjamin E Lanier
*Assistant Examiner* — Huan V Doan
(74) *Attorney, Agent, or Firm* — Fernando & Partners, LLP; Jacob A. Smith (57) ABSTRACT

In one embodiment, a method includes receiving usage data regarding usage of a subscription-based media service account, generating a plurality of sharing scores based on the usage data, each of the plurality of sharing scores being indicative of a confidence that the usage of the subscription-based media service account is subject to a respective type of sharing, comparing each of the plurality of sharing scores to a respective threshold, and, in response to one of the plurality of sharing scores exceeding its respective threshold, presenting a challenge associated with the respective type of sharing.

17 Claims, 8 Drawing Sheets

(51) Int. Cl.
G06Q 10/06 (2012.01)
G06Q 30/00 (2012.01)
(52) U.S. Cl.
CPC ......... *G06Q 30/0185* (2013.01); *H04L 63/08* (2013.01); *H04L 63/1433* (2013.01); *H04L 63/20* (2013.01)

(56) References Cited

U.S. PATENT DOCUMENTS

| | | | | |
|---|---|---|---|---|
| 2005/0160280 A1* | 7/2005 | Caslin | ................... | G06F 21/55 |
| | | | | 713/189 |
| 2009/0049555 A1* | 2/2009 | Cho | ................... | G06F 21/31 |
| | | | | 726/26 |
| 2011/0289597 A1* | 11/2011 | Hinds | ................... | G06F 21/316 |
| | | | | 726/28 |
| 2014/0325646 A1* | 10/2014 | Turgeman | ............ | G06F 21/316 |
| | | | | 726/22 |
| 2016/0006720 A1* | 1/2016 | Spaulding | ........... | H04L 63/0838 |
| | | | | 726/8 |
| 2017/0046706 A1* | 2/2017 | Agarwal | ............ | G06Q 20/4016 |

OTHER PUBLICATIONS

Blum, Mitigate and Prevent Subscription Sharing for SaaS Companies, 6 pages (Year: 2014).*
International Search Report and Written Opinion for corresponding PCT/US2016/069184 dated Feb. 27, 2017.
International Preliminary Report on Patentability for corresponding PCT/US2016/069184 dated Jul. 19, 2018.

* cited by examiner

FIG. 1

| Sharing Type | Users | Motivation | Knowledge of Sharers to Account Owner | Sharing Relationship |
|---|---|---|---|---|
| Casual Sharing (Personal Collusion / Known Sharing) | | | | |
| Sharing with Friends | Account Owner, Sharer (Friend) | Benevolence | Much Knowledge | Collusion |
| Business Sharing (Business Collusion / Known Sharing) | | | | |
| Pooling Accounts | Many Poolers (one Registers Account) | Very Cheap Service | Minimal | Collusion |
| Swapping of Accounts | Account Owner, Sharer (Business Partner) | Mutually Benefical | Minimal | Collusion |
| Selling Valid or Fraudulent Accounts to Many Buyers | Account Owner, Many Shares (Buyers) | Profit | Minimal | Collusion |
| Stolen Accounts (Credentials Purchased or Extracted Illegally / Unknown Sharing) | | | | |
| Thief uses Stolen Credentials for his own Viewing | Account Owner (Innocent), Sharer (Thief) | Free Service | None | Parasitical |
| Thief sells Stolen Credentials to many Buyers | Account Owner (Innocent), Middleman (Thief), Sharers (Buyers) | Profit | None | Parasitical |

ACCOUNT SHARING DETECTION

CROSS-REFERENCES TO RELATED APPLICATIONS

This application claims priority to U.S. Provisional Patent App. No. 62/274,671, filed Jan. 4, 2016, and hereby incorporated by reference in its entirety.

TECHNICAL FIELD

The present disclosure relates generally to subscription-based media systems, and in particular, to systems, methods and apparatuses enabling detecting of different types of sharing of subscription-based media systems.

BACKGROUND

In the business of online subscription-based media services such as NFL Game Pass, MLB.Com, Hulu, Netflix, or Amazon Prime Instant Video, one of the biggest threats is the sharing of credentials by multiple non-paying users (sharers), where multiple users can view content using one subscription account.

Credential sharing can cause significant losses to a service provider due to, among other things, potential lost revenues from non-paying users, added cost in providing wasted resources (such as processing power, bandwidth of a content delivery network, etc.) to non-paying users, and poisoning of the brand of the service provider based on proclamations of stolen account credentials.

Sharing can be much more complicated with subscription-based media systems than for standard banking or credit card sites, which are only worried about rogue activity based on the input of stolen credentials. For example, in subscription-based media systems, users may willingly share their credentials to provide account access to other users. In subscription-based media systems, sharing may be performed by a multiplicity of users with a variety of motivations.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for efficiently detecting sharing of a subscription-based media system account. For example, in some implementations, a method includes receiving usage data regarding usage of a subscription-based media service account, generating a plurality of sharing scores based on the usage data, each of the plurality of sharing scores indicating a confidence that the usage of the subscription-based media service account is subject to a respective type of sharing, comparing each of the plurality of sharing scores to a respective threshold, and, in response to one of the plurality of sharing scores exceeding its respective threshold, presenting a challenge associated with the respective type of sharing.

Example Embodiments

Figure 1:
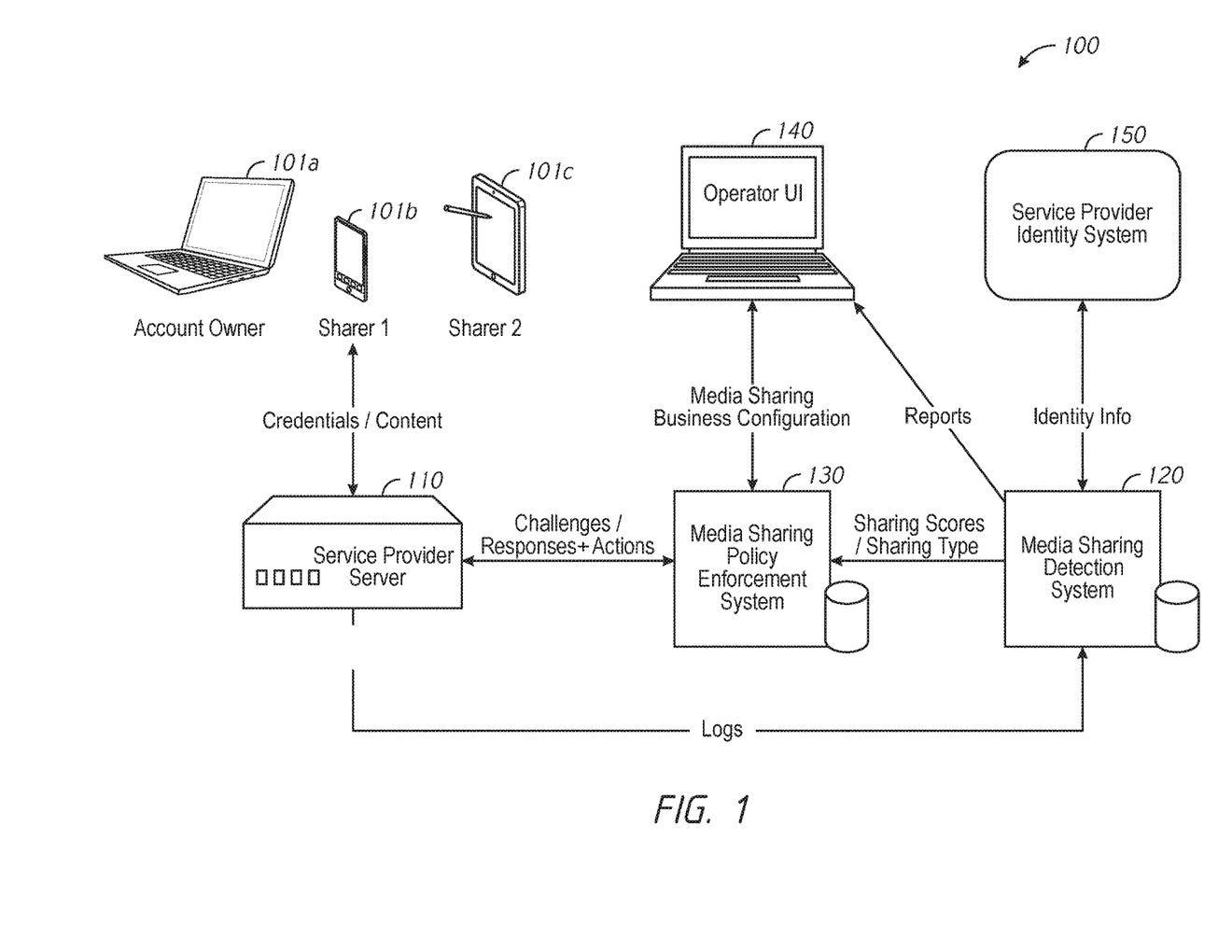
FIG. 1 is a block diagram of a network including a media sharing detection system in accordance with some implementations.

FIG. 1 is a block diagram of a network 100 including a media sharing detection system 120 in accordance with some implementations. While certain specific features are illustrated, those of ordinary skill in the art will appreciate from the present disclosure that various other features have not been illustrated for the sake of brevity and so as not to obscure more pertinent aspects of the example implementations disclosed herein. To that end, the network 100 includes a number of user devices 101a-101c that can be used by respective users to access a service provider server 110. The service provider server 110 provides a subscription-based media service. Thus, in response to receiving credentials from a user device 101a-101c, the service provider server 110 provides media content to the user device 101a-101c. The media content can include audio, video, or other media content. The provided credentials are the means by which users of the user devices 101a-101c can prove their identities to the service provider web server 110 during a login or content request. The credentials can include, for example, a username and password. In various implementations, the credentials can include secure cookies, OAuth (open standard for authorization) tokens, or SAML (Security Assertion Markup Language) assertions received as a result of a previous authentication (e.g., using a username and password)

Figure 2:
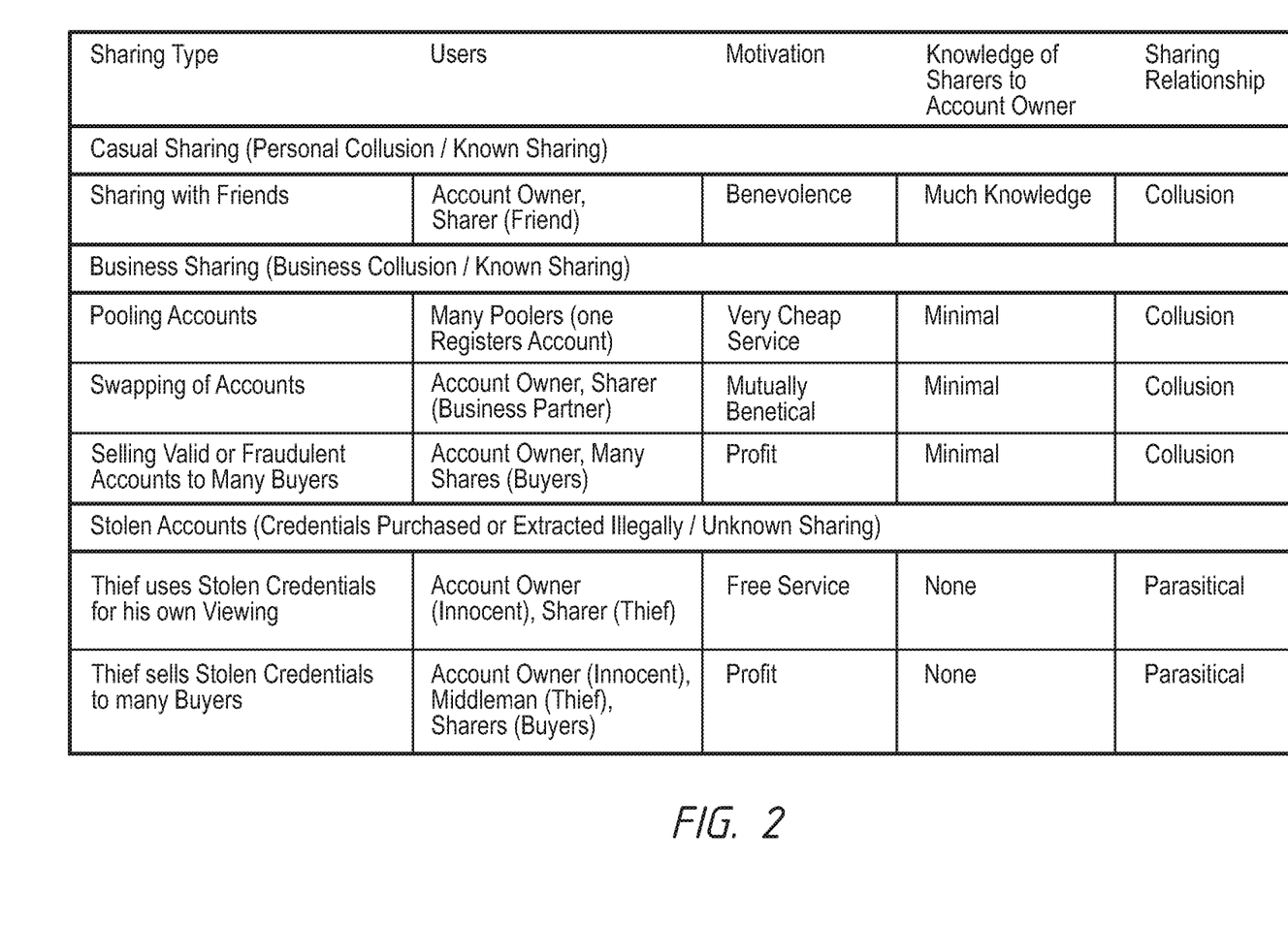
FIG. 2 is a table illustrating a number of different types of sharing in accordance with some implementations.

As noted above, credential sharing can cause significant losses to a service provider. To that end, the network 100 includes a media sharing detection system 120 to detect sharing of credentials for an account with the service provider. As also noted above, in subscription-based media services, sharing may be performed by a multiplicity of users with a variety of motivations, e.g., based on stolen accounts or based on a form of personal or business collusion. A number of different types of sharing are shown in the table of FIG. 2.

A first type of sharing is referred to as casual sharing. Casual sharing is a type of collusive sharing that is known to the account owner and is enabled by collusion between the account owner and other users (e.g., sharers). Casual sharing includes sharing with friends and users can include the account owner and one or more sharers who are friends of the account owner. Thus, the account owner and the sharers have much knowledge about one another. The account owner may be motivated to engage in casual sharing by benevolence and/or friendship.

A second type of sharing is referred to as business sharing. Business sharing is a type of collusive sharing that is known to the account owner and is enabled by collusion between the account owner and other users (e.g., sharers). Business sharing includes pooling accounts (possibly from multiple service providers) and users can include multiple poolers who each contribute to pay for an account, but of which only one is the registered owner of the account. Thus, users may be motivated to pool accounts in order to reduce the cost of the service and the account owner and the sharers may have minimal knowledge about one another.

Business sharing also includes swapping of accounts and users can include an account owner and a swapper who provides access to an account of another service provider in exchange for access to the account. Users may be motivated to swap accounts in order to mutually benefit from the exchange of account access. Thus, the account owner and the swapper may have minimal knowledge about one another.

Business sharing also includes selling accounts to many buyers. An account owner can provide access to other users (e.g., sharers) in exchange for money. Thus, the account owner may be motivated to engage in selling accounts by profit and the account owner and the other users may have minimal knowledge about one another.

A third type of sharing is referred to as stolen account sharing. Stolen account sharing is a type of parasitical sharing that is unknown to the account owner and is enabled by illegally extracted credentials. Stolen account sharing can include a thief using stolen credentials for his own viewing as motivated by access to a free service. Thus, the account owner and the thief may have no knowledge about one another. Stolen account sharing can include a thief selling stolen credentials to multiple buyers as motivated by profit. Thus, the account owner and the buyers may have no knowledge about one another.

Referring, again, to FIG. 1, the media sharing detection system 120 identifies both the existence of sharing and, in some implementations, the sharing type. Although FIG. 2 illustrates a number of different sharing types, the media sharing detection system 120 may not identify each of the different sharing types of FIG. 2 and/or may identify other sharing types not illustrated in FIG. 2. The media sharing detection system 120 provides this information to a media sharing policy enforcement system 130 that, in response, recommends proactive events to the service provider server 110.

To that end, the media sharing detection system 120 includes data analytic modules (as described further below with respect to FIG. 3) and receives logs of account creation, logins, and content consumption, e.g., from the service provider server 110, license generators, CDNs (content delivery networks), subscriber management systems, etc. The media sharing detection system 120 receives identity information from a service provider identity system 150 that describes the various users. In some implementations, the service provider identity system 150 is implemented as part of the service provider server 110. As described further below, the media sharing detection system 120 uses data science to determine a sharing score for each sharing type by classifying users based on their behavioral profiles. The media sharing detection system 120 provides the sharing scores to the media sharing policy enforcement system 130. The media sharing detection system 120 can also provide the sharing scores (and/or data visualization or other reports based on the sharing scores over time) to an operator user interface 140.

Figure 3:
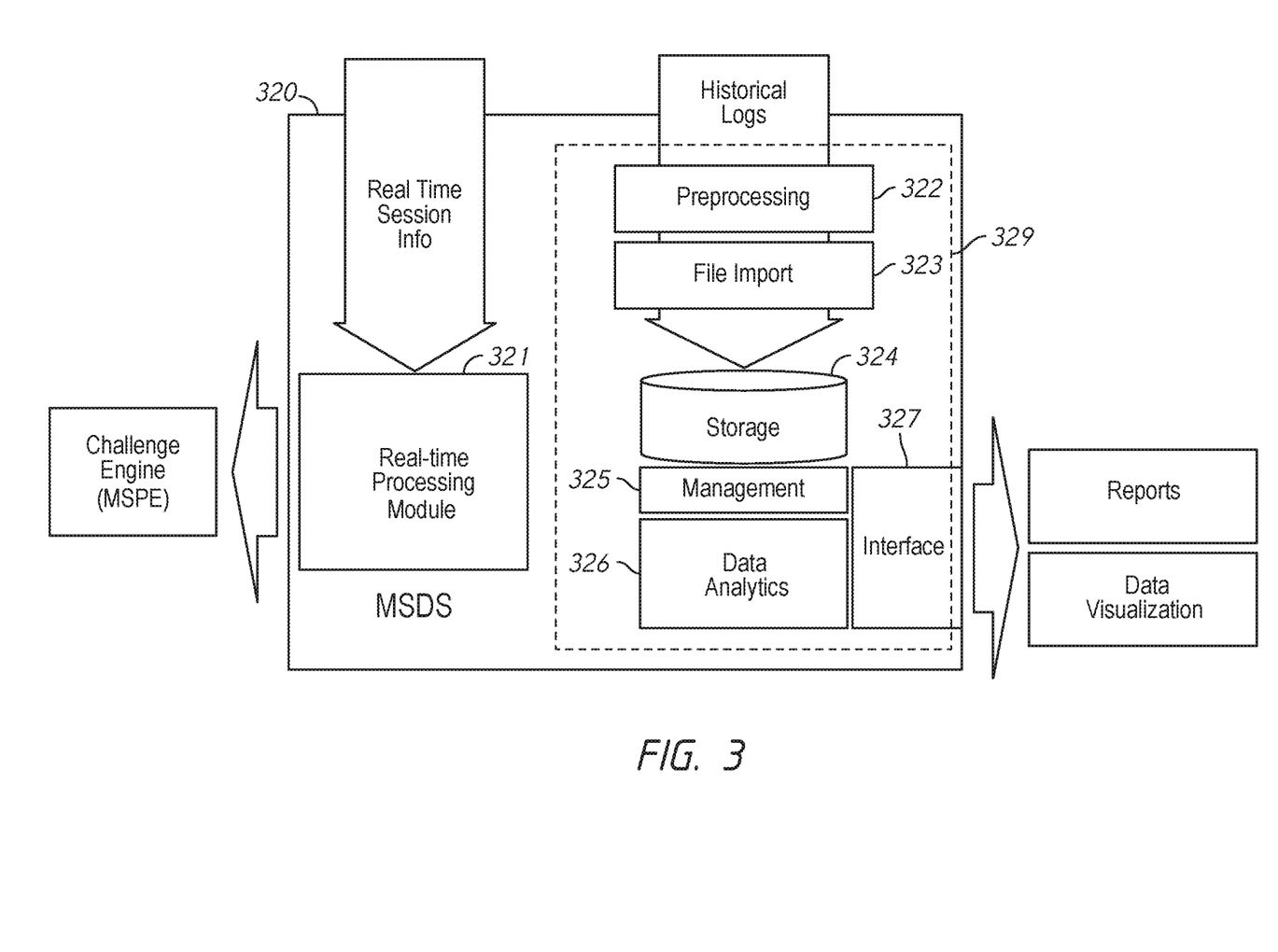
FIG. 3 is a block diagram of a media sharing detection system in accordance with some implementations.

FIG. 3 is a block diagram of a media sharing detection system 320 in accordance with some implementations. The media sharing detection system 320 can be used as the media sharing detection system 120 of FIG. 1 and perform one or more of the functions described herein with respect to the media sharing detection system 120. As mentioned above and described further below, the media sharing detection system 320 includes a number of data analytic modules that process logs of account creation, logins, and content consumption and generates sharing scores for each of a number of sharing types.

The media sharing detection system 320 includes a real-time processing module 321 that processes real-time session information and generates sharing scores. In various implementations, the real-time processing module 321 can be a cluster computing module.

The media sharing detection system 320 include a historical processing module 329 that receives historical logs and generates reports and/or data visualization of sharing scores. In some implementations, the real-time processing module 321 provides sharing scores that are stored by the historical processing module.

The historical processing module 329 includes a preprocessing module 322 that receives the historical logs and preprocesses the historical logs to generate preprocessed data. The preprocessing module 322 can perform aggregation, normalization, and data enrichment of the information received in the historical logs to generate the preprocessed data.

The historical processing module 329 includes a file import module 323 that imports the preprocessed data into storage 324. The file import module 323 can be implemented as a publish-subscribe messaging module. The storage 324 can be implemented as a file system. The storage 324 can be managed by a management module 325, which may be implemented as a resource negotiator module. The preprocessed data in the storage 324 can be analyzed by a data analytics module 326 to generate reports and data visualization that are output via an interface module 327.

Referring, again, to FIG. 1, the network 100 includes a media sharing policy enforcement system 130. The media sharing policy enforcement system 130 receives a service provider configuration as input (e.g., via an operator user interface 140), such as which sharing type to prevent, permitted challenges to be presented to the user, confidence required before a challenge is enacted, and confidence required before an action or response is taken.

Based on the service provider configuration and the sharing scores, the media sharing policy enforcement system 130 recommends challenges to the service provider server 110, evaluates a response to the challenge, and recommends anti-sharing actions based on an evaluation of the response. The challenge can take many forms based on the sharing type. In some implementations, presenting the challenge includes transmitting a question to a user and receiving an answer from the user. For example, presenting the challenge can include asking the account owner to identify content the projected sharer has recently watched. Further examples of challenges are described further below.

The operator user interface 140, in additional to providing the service provider configuration to the media sharing policy enforcement system 130, can provide views, statistics and descriptive analytics of all sharing occurring in the system. In various implementations, the operator user interface 140 can display a decomposition of the sharers, specifically identifying the account owner. An example of such a display is described below with respect to FIG. 5. In various implementations, the account owner is identified as the first user who accessed (or created) the account or a user accessing the account from a registered address of the account.

Figure 4:
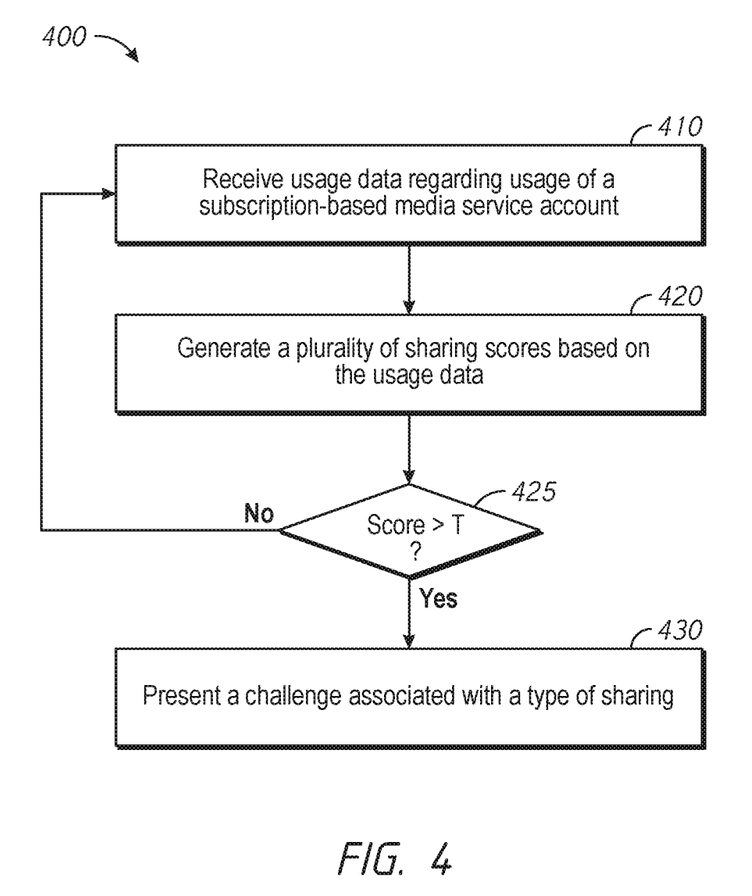
FIG. 4 is a flowchart representation of a method of detecting sharing in accordance with some implementations.

FIG. 4 is a flowchart representation of a method of detecting sharing in accordance with some implementations. In some implementations (and as detailed below as an example), the method 400 is performed by a media sharing system, such as the media sharing predication system 120 and/or media sharing recommendations system 130 of FIG. 1. In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, the method 400 includes receiving data regarding usage of an account, generating a plurality of sharing scores indicative of different types of sharing of the account, and, in response to one of the sharing scores exceeding a respective threshold, presenting a respective challenge. The method 400 can be performed for a number of accounts.

The method 400 begins, at block 410, with the media sharing system receiving usage data regarding usage of a subscription-based media service account. The usage data can include data regarding, for example, creation of the account, updating of account information, logins to the account, and content consumption from within the account. With respect to account access, creation or modification, the usage data can indicate, among other things, an IP address of a user device used to access, create, or modify the account, device properties of a user device used to access, create, or modify the account (e.g, device ID, type, OS, screen size, etc.), a location of a user device used to access, create, or modify the account, or a time a user device accessed, created, or modified the account. With respect to content consumption, the usage data can indicate, among other things, content selected for consumption, a time or duration content was consumed, the presence or absence of subtitles during content consumption, or usage of trick modes (e.g., fast-forward and rewind) during content consumption.

At block 420, the media sharing system generates a plurality of sharing scores based on the usage data. Each of the plurality of sharing scores indicates a confidence that the usage of the subscription-based media service account is subject to a respective type of sharing.

A number of different types of sharing are shown in FIG. 2. In some implementations, the plurality of sharing scores can include two sharing scores associated with collusive sharing and parasitical sharing, respectively. In some implementations, the plurality of sharing scores can includes three sharing scores associated with casual sharing, business sharing, and stolen account sharing, respectively. In some implementations, the plurality of sharing scores can include multiple sharing scores associated with various types of sharing shown in FIG. 2. For example, in some implementations, the media sharing system can differentiate between different types of projected casual sharers (e.g., family members and non-family members) based on inspecting the data and knowing the various trends on TV family viewing.

In some implementations, generating the sharing scores includes determining a number of different users of the account. By analyzing the usage data, the media sharing system can generate various behavioral profiles per account. Different users of an account are identified and logged, where a given user is classified by some combination of behavioral features. Data science routines can also be used to distinguish between the account owner (e.g, the person who registered for the account) and other projected sharers. Examples of behavioral features that identify a unique user within each subscription account can include, for example, IP address, device properties (ID, type, OS, screen size, etc.), location, viewing times, favorite shows, favorite sports team, genres of content, typical viewing duration, subtitle usage, trick mode usage, and variability of viewing patterns (as indicated by the usage data).

Figure 5:
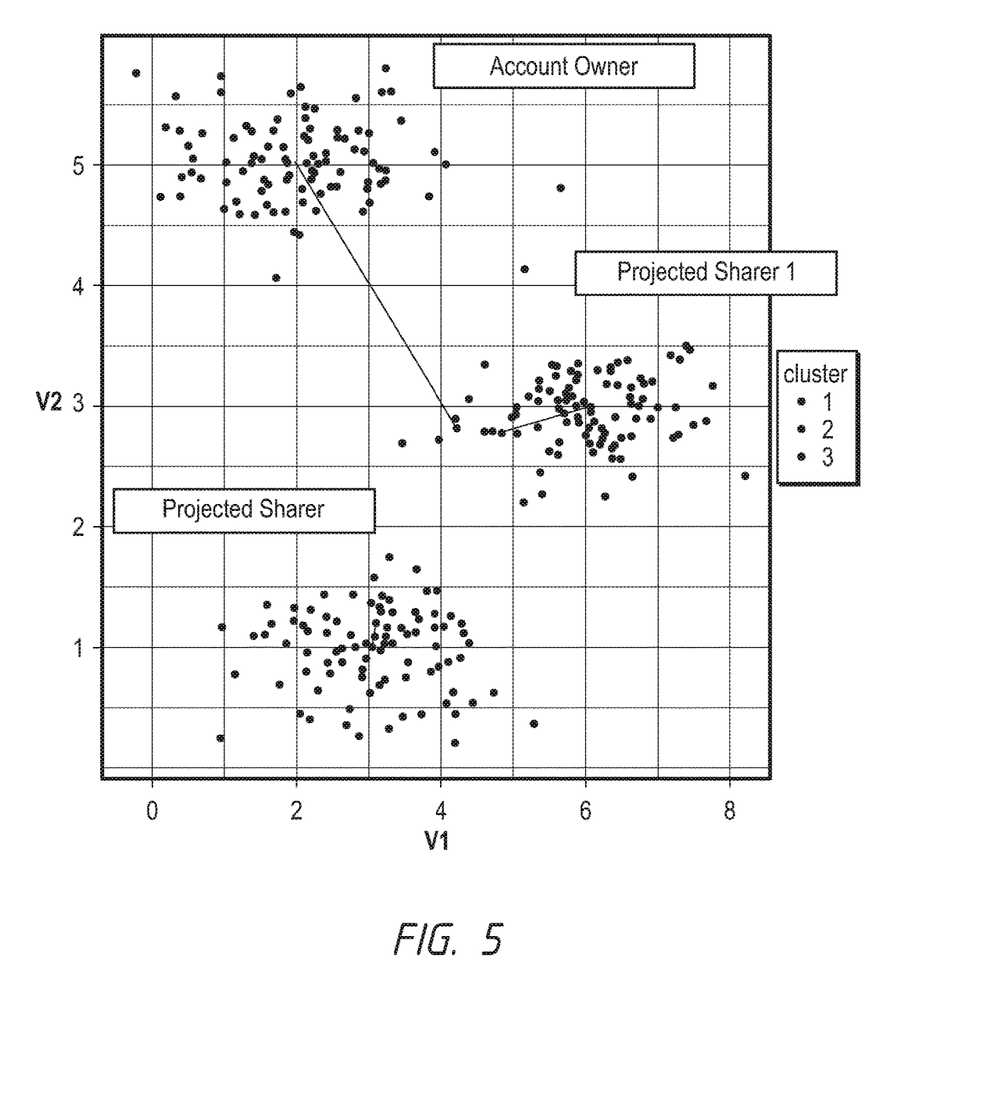
FIG. 5 is an example graph showing a classification algorithm applied to two variables in accordance with some implementations.

The weighting of the various features can be determined by data science routines, such as logistic regression or decision trees. Further, data science algorithms, such as multi-class classification, can be used to distinguish different users based on these aforementioned features within an account. An example is shown in FIG. 5 where the users are not only differentiated but labelled. The account owner, for instance, is recognized by various means, such as comparing the device and location of viewing with the account registration IP address, device type, location, or currency. Although FIG. 5 shows a classification algorithm applied to two variables (e.g., location and time), the media sharing system can apply a classification algorithm using more than two variables to identify and/or track different users. Thus, in some implementations, determining the number of users of an account includes applying a classification algorithm to multiple variables of the usage data.

In some implementations, the media sharing system classifies each projected user as either a child or an adult based on the behavioral features of the projected user. Based on this classification, the media sharing system can employ a data science algorithm to determine a confidence that all projected users of an account belong to a single family (or household) in order to differentiate between what may be acceptable sharing (within a family or household) or unacceptable sharing (to members external to the family or household).

Figure 6:
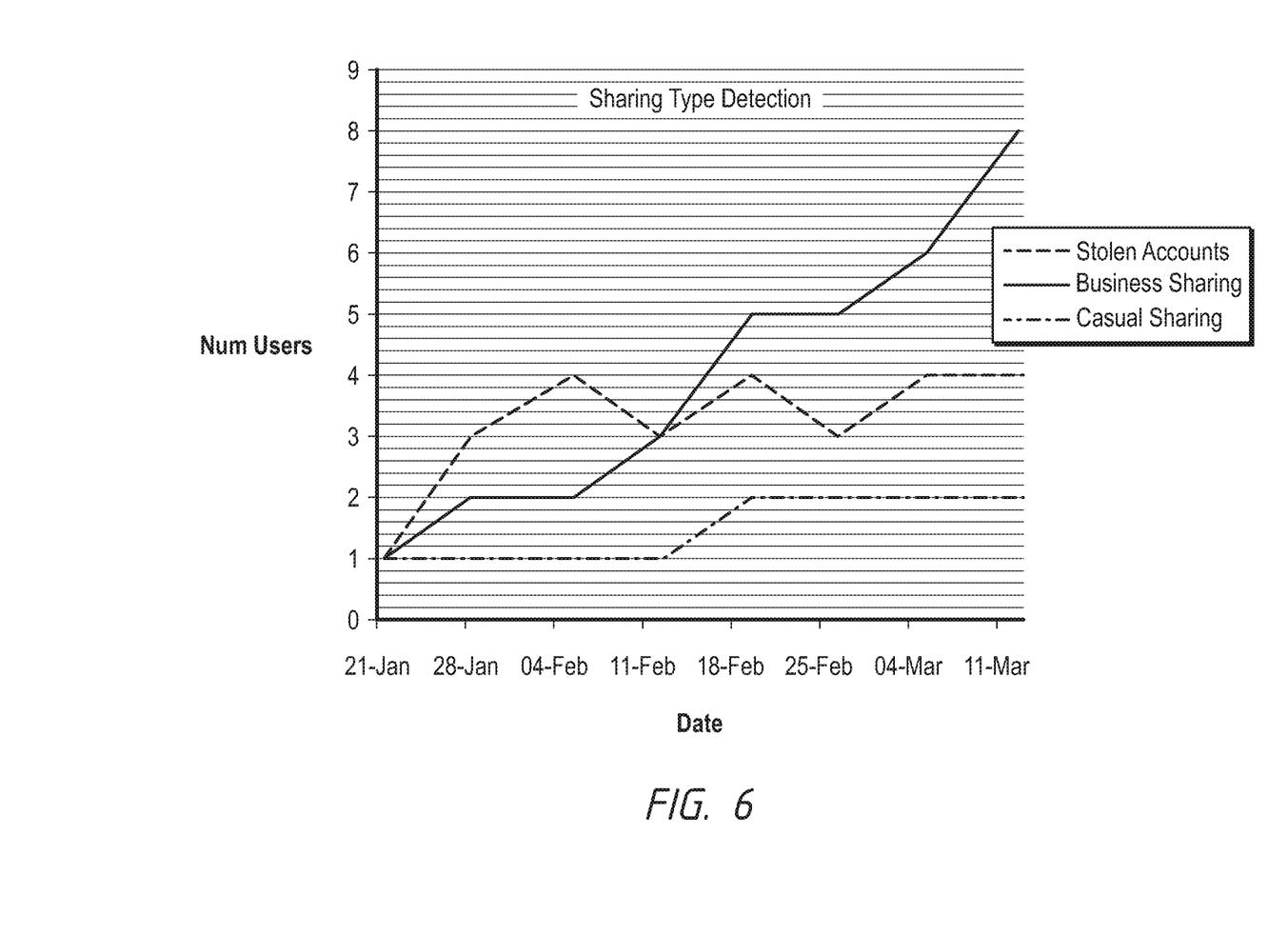
FIG. 6 is an example graph of the number of users over time for three different sharing types in accordance with some implementations.

When an account is identified being shared by multiple users, the media sharing system can use multi-variate data science algorithms to generate the plurality of sharing scores for a plurality of different sharing types according to features that differentiate the various sharing types. For example, the number of sharers can be used to determine the sharing scores for different sharing types. In particular, the number of sharers can be greater for business sharing than for casual sharing. As another example, the number of concurrency violations (e.g., the number of times multiple users are logged in simultaneously) can be used to determine the sharing scores for different sharing types. In particular, the number of concurrency violations can be greater for business sharing than for casual sharing. As another example, the larger the number of accounts a single user is identified on can be used to determine that each of those accounts is more likely subject to various sharing types. In particular, users of stolen accounts can appear on multiple accounts. As another example, the number of users over time can be used to determine the sharing scores for different types of sharing. In particular, the number of users can be relatively fixed for casual sharing, but variable for business sharing or stolen account sharing. Further, the number of users can grow over time relatively constantly for business sharing. FIG. 6 shows an example graph of the number of users over time for three different sharing types. As another example, the viewing patterns can be used to determine the sharing scores for different types of sharing. In particular, whereas viewing patterns are relatively fixed for casual sharing and business sharing, they may be relatively variable for stolen accounts. In general, sensing changes in activity of the account over time (e.g., the viewing patterns, the amount of content consumed, the number of log-ins, or other characteristics) can be indicative of sharing. For example, increased activity over time (particularly, abrupt increases in activity) for an account can indicate the addition of a new user to that account.

In some implementations, the sharing scores are generated based on prediction algorithms using tools such as Bayes networks decision trees, random forests, logistic regression, or support vector machines, taking into account the extracted features based on the usage data. Thus, in various implementations, the sharing scores can indicate a likelihood or probability that an account is subject to particular type of sharing.

In various implementations, the sharing scores are generated by classification model constructed using training data. The training data can include logs, as described above, and/or features extracted from the training data. Such features can include, for example, the mean number of different IP addresses from which an account was accessed per day, the mean number of different user devices from which an account was accessed per day, a histogram of the number of consumption events occurring in each hour of the day for an account (or statistics regarding this histogram such as the standard deviation), or the total number of different countries from which the account was accessed over a time period (e.g., 90 days). The same features may be used to generate the sharing scores.

At block 425, the media sharing system compares each of the plurality of sharing scores to a respective threshold. If none of the sharing scores exceeds its respective threshold, the method 400 returns to block 410. If one of the sharing scores exceeds its respective threshold, the method 400 continues to block 430.

The thresholds can be configured by the service provider for each sharing type (e.g, via a user interface such as the operator user interface 140 of FIG. 1). Thus, in some implementations, the method 400 includes receiving a media sharing policy via a user interface including the respective thresholds. The user interface can also be used by the media sharing system to provide a report based on the sharing scores.

At block 430, the media sharing system presents a challenge associated with the respective type of sharing. For example, if the sharing score for casual sharing exceeds the casual sharing threshold, a casual sharing challenge is presented. As another example, if the sharing score for stolen account sharing exceeds the stolen account sharing threshold, a stolen account sharing challenge is presented.

In some implementations, once a particular sharing type is detected by comparing the sharing score to a service provider configurable threshold, the media sharing system challenges either the account owner or sharer with a question that is relevant to that sharing type. The question is based on knowledge of the nature of the relationship between the account owner and the sharer, which is different per sharing type (as described above and shown in the table of FIG. 2). A set of challenges for each sharing type is maintained by the media sharing system. In some implementations, the challenges are provided via the user interface as part of the media sharing policy. A particular challenge can be selected based on some combination of service provider preferences, analytic results, and random selection.

The challenge can take many forms based on the sharing type. In some implementations, presenting the challenge includes transmitting a question to a user and receiving an answer from the user. For example, presenting the challenge can include asking the account owner to identify content the projected sharer has recently watched, which can be useful for confirming casual sharing and business sharing. Presenting the challenge can include asking the account owner or the projected sharer the last time the other watched online video, which can be useful for confirming for business sharing. Presenting the challenge can include asking the projected sharer information about the account owner collected during registration, specifically information not presented in the account details of the UI, which may be useful for confirming business sharing and stolen accounts. Thus, in some implementations, presenting a challenge includes transmitting a question to the user regarding usage of the subscription-based media service account by another user.

Presenting the challenge can include changing the credentials of the account owner and detecting how many projected sharers still enter the old credentials, which may be useful for confirming a stolen account. Presenting the challenge can include asking the projected sharer to prove that he is the owner of the mobile phone registered by the account owner via usage of SMS, which can be useful in confirming all types of sharing. Presenting the challenge can include asking the projected sharer to enter an alphanumeric code or audio code displayed or played by a set-top box, which may be useful for confirming all types of sharing.

In various implementations, each response is timed in order to detect whether the account owner and sharer are colluding on answering the challenge. In some implementations, it may be undesirable to alert the account owner of a stolen account that sharing is occurring. Thus, in some implementations, the media sharing system is not configured to pose a challenge to the account owner to confirm stolen account sharing. However, in other implementations, it may be desirable to alert the account owner of a stolen account that sharing is occurring. Thus, in some implementations, the media sharing system is configured to pose a challenge only to the account owner to confirm stolen account sharing.

In some implementations, the method 400 includes further action, in response to determining that that the challenge has been failed, e.g., that an answer returned in response to a question does not match an expected response. In various implementations, the media sharing policy described above can include proactive events to be taken if the challenge associated with the respective type of sharing is failed. As described further below, the method 400 includes, in various implementations, warning an owner of the account, suspending the account, or blacklisting the account in response to determining that the challenge has been failed.

In some implementations, the media sharing system blacklists a user based on behavioral profiles across multiple accounts. Blacklisting can be applied to stolen accounts, where the projected sharer cycles multiple credentials of different accounts without the knowledge of the account owners. It may be desirable to not risk losing the business of the innocent account owners by revealing to them that their credentials were stolen.

In some implementations, the media sharing system warns the user that sharing was detected. Such an action can be used for casual sharing, where the number of sharers is typically limited and fixed. In such a case, the service provider may desire to maintain the business of the account owner even after collusion with sharers.

In some implementations, the media sharing system forces the account owner to change credentials (e.g, to highly secure credentials). Such a credential change can be applied to accounts in which business sharing or stolen account sharing is detected.

In some implementations, the media sharing system terminates an account. Such a response can be performed in response to detection of business sharing or to casual sharing after multiple warnings.

The media sharing system can use feedback, such as a correctly-answered challenge, and operational security, to continuously refine the classification algorithms and/or other algorithms. For each false positive (i.e. the sharing score exceeded a threshold, but a presented challenge was passed), the classification model can be refined and improved (e.g., by removing the account from the training data), thus decreasing false positives in the future. Further, by using some feedback on false negatives, e.g. intelligence gathered by operational security or customer service data detecting stolen accounts that were missed, the classification model can be refined to catch more accounts in the future (by adding the account to the training data). Thus, an outcome of the challenge can be used to provide feedback in generating the plurality of sharing scores.

Using feedback can assist in achieving the objective of minimizing the number of presented challenges. In particular, using feedback can assist in achieving the objectives of keeping precision high and the false positive rate low.

Figure 7:
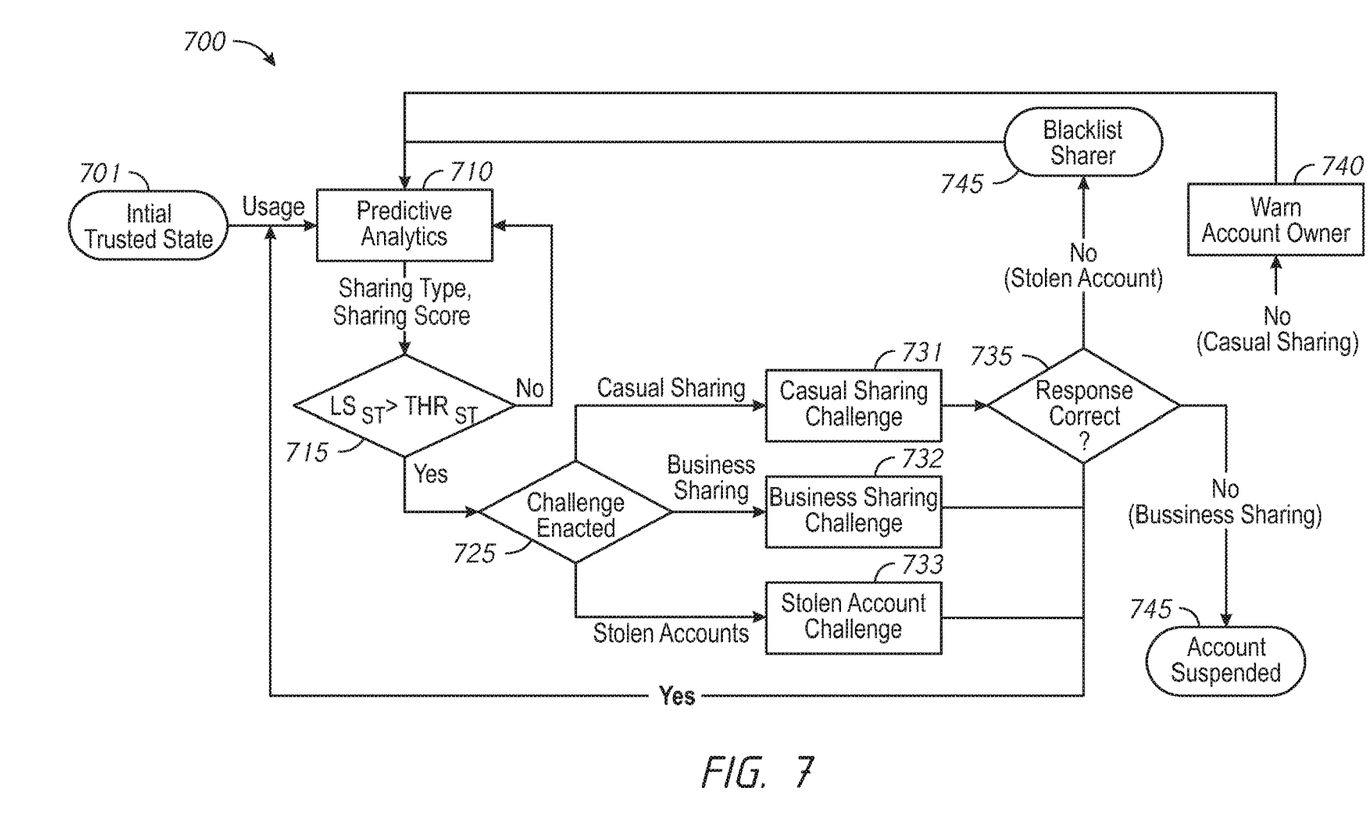
FIG. 7 is a state diagram defining detection and response of media credential sharing in accordance with some implementations.

FIG. 7 is a state diagram defining detection and response of media credential sharing in accordance with some implementations. A system (e.g., a media sharing system) begins an initial trusted state 701. Once usage data is received by the system, predictive analytics are performed by the system (at block 710) on usage data (which can include, for example, historic logins and content consumption), resulting in sharing scores for a plurality of different sharing types. If the system determines that the sharing scores for each of the plurality of different sharing types are below their respective thresholds (at block 715), the system returns to block 710. If the system determines that the sharing score for a particular sharing type is about its respective threshold (at block 715), the system determines that a challenge is to be enacted (at block 725). The challenge can be, for example, a casual sharing challenge (presented at block 731), a business sharing challenge (presented at block 732), or a stolen account sharing challenge (presented at block 733).

If the system determines that the presented challenge has been passed (at block 735), the system returns to block 710. If the system determines that a causal sharing challenge has been failed (at block 735) and further determines that less than a threshold number of warnings (e.g., three warnings) have been given, the system gives a warning (at block 740) and returns to block 710. If the system determines that a business sharing challenge has been failed (at block 735), the system suspends the account (at block 745). If the system determines that a stolen account sharing challenge has been failed (at block 735), the system blacklists the IP address and/or user device of the user and returns to block 710.

Figure 8:
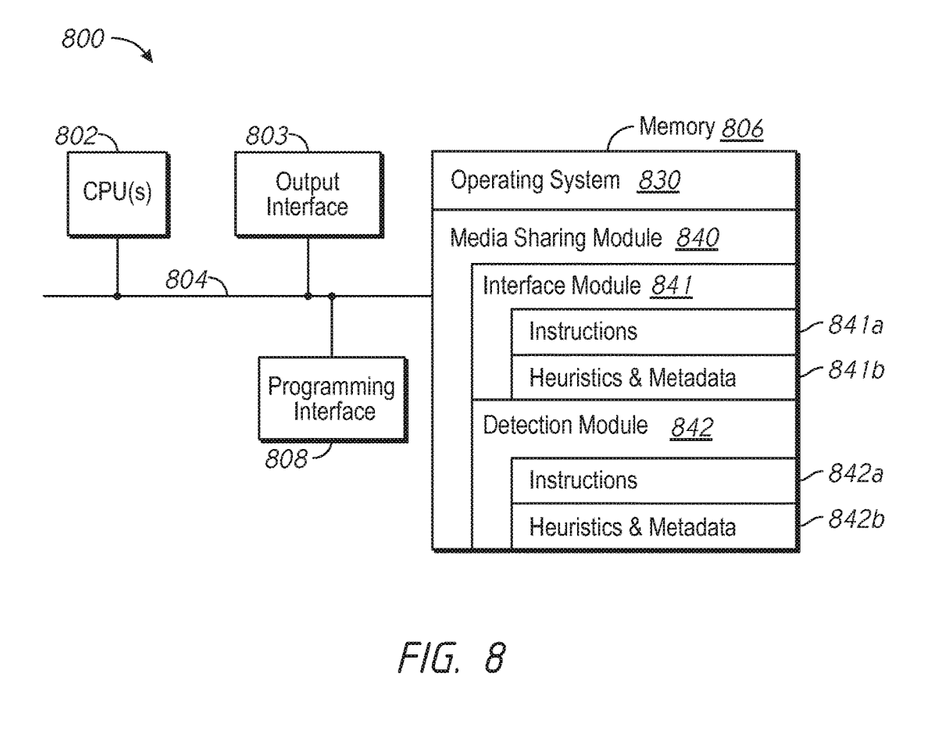
FIG. 8 is a block diagram of a computing device in accordance with some implementations.

FIG. 8 is a block diagram of a computing device 800 in accordance with some implementations. In some implementations, the computing device 800 corresponds to the media sharing detection system 120 and/or media sharing policy enforcement system 130 of FIG. 1 and performs one or more of the functionalities described above with respect to those systems. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803 (e.g., a network interface), a memory 806, a programming interface 808, and one or more communication buses 804 for interconnecting these and various other components.

In some implementations, the communication buses 804 include circuitry that interconnects and controls communications between system components. The memory 806 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some implementations, the memory 806 or the non-transitory computer readable storage medium of the memory 806 stores the following programs, modules and data structures, or a subset thereof including an optional operating system 830 and a media sharing module 840. In some implementations, one or more instructions are included in a combination of logic and non-transitory memory. The operating system 830 includes procedures for handling various basic system services and for performing hardware dependent tasks. In some implementations, the media sharing module 840 is configured to detect various types of sharing. To that end, the media sharing module 840 includes an interface module 841 and a detection module 842.

In some implementations, the interface module 841 is configured to receive usage data regarding usage of a subscription-based media service account. To that end, the interface module 841 includes a set of instructions 841a and heuristics and metadata 841b. In some implementations, the detection module 842 is configured to generate a plurality of sharing scores based on the usage data, each of the plurality of sharing scores being indicative of a confidence that the usage of the subscription-based media service account is subject to a respective type of sharing. To that end, the detection module 842 includes a set of instructions 842a and heuristics and metadata 842b. In some implementations, the detection module 842 is further configured to compare each of the plurality of sharing scores to a respective threshold. In some implementations, the interface module 841 is further configured to, in response to one of the plurality of sharing scores exceeding its respective threshold, present a challenge associated with the respective type of sharing.

Although the media sharing module 840, the interface module 841, and the detection module 842 are illustrated as residing on a single computing device 800, it should be understood that in other embodiments, any combination of the media sharing module 840, the interface module 841, and the detection module 842 can reside in separate computing devices in various implementations. For example, in some implementations each of the media sharing module 840, the interface module 841, and the detection module 842 reside on a separate computing device.

Moreover, FIG. 8 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
receiving usage data regarding usage of a subscription-based media service account;
generating a plurality of sharing scores based on the usage data, each of the plurality of sharing scores being indicative of a confidence that the usage of the subscription-based media service account is subject to a respective type of sharing of a plurality of types of sharing of the subscription-based media service account;
comparing each of the plurality of sharing scores to a respective threshold of a plurality of thresholds;
in response to one of the plurality of sharing scores exceeding its corresponding threshold, determining a corresponding one of the plurality of types of sharing of the subscription-based media service account and presenting a challenge associated with the corresponding one of the plurality of types of sharing of the subscription-based media service account; and
receiving a media sharing policy via a user interface including the corresponding threshold, wherein the media sharing policy further includes proactive events to be taken if the challenge is failed, wherein an outcome of the challenge is used to provide feedback in generating the plurality of sharing scores.

2. The method of claim 1, wherein the usage data includes information indicative of content selected for consumption, a time or duration content was consumed, presence or absence of subtitles in consumed content, or usage of trick modes during content consumption.

3. The method of claim 1, wherein generating the plurality of sharing scores includes determining a number of users of the account.

4. The method of claim 3, wherein determining the number of users of the account includes applying a classification algorithm to multiple variables of the usage data.

5. The method of claim 3, wherein determining the number of users of the account includes identifying each of the number of users based on a plurality of behavioral features.

6. The method of claim 3, wherein determining the number of users of the account includes identifying an account owner of the account and one or more projected sharers.

7. The method of claim 3, further comprising classifying each of the number of users as a child or an adult and determining a confidence that the number of users belong to a single family or household.

8. The method of claim 1, wherein the plurality of types of sharing of the subscription-based media service account include collusive sharing and parasitical sharing.

9. The method of claim 1, wherein presenting the challenge includes transmitting a question to a user and receiving an answer from the user.

10. The method of claim 9, wherein presenting the challenge includes determining a time between transmitting the question and receiving the answer.

11. The method of claim 9, wherein presenting the challenge includes transmitting a question to the user regarding usage of the subscription-based media service account by another user.

12. The method of claim 1, further comprising, in response to determining that the challenge has been failed, warning an owner of the account, suspending the account, or blacklisting a user of the account.

13. A system comprising:
a network interface;
one or more processors; and
a non-transitory memory comprising instructions that when executed cause the one or more processors to perform operations comprising:
receiving, via the network interface, usage data regarding usage of a subscription-based media service account;
generating a plurality of sharing scores based on the usage data, each of the plurality of sharing scores being indicative of a confidence that the usage of the subscription-based media service account is subject to a respective type of sharing of a plurality of types of sharing of the subscription-based media service account;
comparing each of the plurality of sharing scores to a respective threshold of a plurality of thresholds;
in response to one of the plurality of sharing scores exceeding its corresponding threshold, determining a corresponding one of the plurality of types of sharing of the subscription-based media service account and presenting, via the network interface, a challenge associated with the corresponding one of the plurality of types of sharing of the subscription-based media service account; and
receiving, via the network interface, a media sharing policy including the corresponding threshold, wherein the media sharing policy further includes proactive events to be taken if the challenge is failed, wherein an outcome of the challenge is used to provide feedback in generating the plurality of sharing scores.

14. The system of claim 13, wherein the operations further comprise determining a number of users of the account by applying a classification algorithm to multiple variables of the usage data.

15. The system of claim 13, wherein the respective types of sharing include two or more of collusive sharing, parasitical sharing, casual sharing, business sharing, or stolen account sharing.

16. The system of claim 13, wherein presenting the challenge includes transmitting, via the network interface, a question to a user and receiving, via the network interface, an answer from the user.

17. A non-transitory computer-readable medium including instructions that when executed by a processor cause a device to:
receive usage data regarding usage of a subscription-based media service account;
generate a plurality of sharing scores based on the usage data, each of the plurality of sharing scores being indicative of a confidence that the usage of the subscription-based media service account is subject to a respective type of sharing of a plurality of types of sharing of the subscription-based media service account;
compare each of the plurality of sharing scores to a respective threshold of a plurality of thresholds;
in response to one of the plurality of sharing scores exceeding its corresponding threshold, determine a corresponding one of the plurality of types of sharing of the subscription-based media service account and present a challenge associated with the corresponding one of the plurality of types of sharing of the subscription-based media service account; and
receive a media sharing policy via a user interface including the corresponding threshold, wherein the media sharing policy further includes proactive events to be taken if the challenge is failed, wherein an outcome of the challenge is used to provide feedback in generating the plurality of sharing scores.

* * * * *